United States Patent [19]

Petersen, Jr.

[11] 3,997,998

[45] Dec. 21, 1976

[54] ICE FISHING HOOK RETRIEVER

[76] Inventor: Harry Petersen, Jr., 1860 Lark Lane, Waterloo, Iowa 50701

[22] Filed: Feb. 3, 1975

[21] Appl. No.: 546,336

[52] U.S. Cl. .................................................. 43/53.5
[51] Int. Cl.² ......................................... A01K 97/00
[58] Field of Search ....................... 43/53.5; 7/1 H; 403/361

[56] References Cited

UNITED STATES PATENTS

| | | | |
|---|---|---|---|
| 797,820 | 8/1905 | Peck | 403/361 X |
| 2,724,207 | 11/1955 | Miller et al. | 43/53.5 |
| 2,947,106 | 8/1960 | Lewan | 43/53.5 |
| 3,050,896 | 8/1962 | Parker | 43/53.5 X |
| 3,555,718 | 1/1971 | Montgomery | 43/53.5 |

*Primary Examiner*—G.E. McNeill
*Assistant Examiner*—Daniel J. Leach

[57] ABSTRACT

A solid wood cylinder handle with a lengthwise cylindrical cavity bored in one end thereof, and a straight elongated wire shaft having one end disposed within the handle cavity. The shaft is confined in the cavity by a cylindrical shaped wood dowel pin wedged therein. The end of the shaft extending outwardly from the handle is bent back upon itself to form a U-shaped hook to engage and help remove a fishhook from a fish.

1 Claim, 8 Drawing Figures

U.S. Patent  Dec. 21, 1976  3,997,998
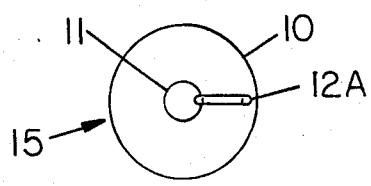
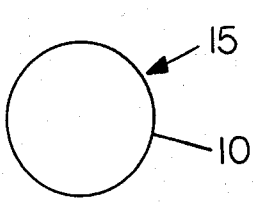
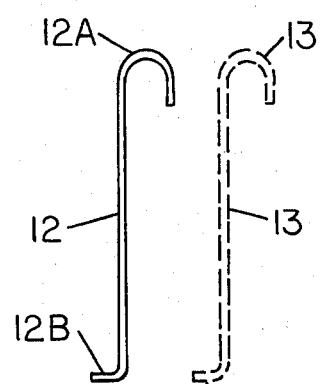
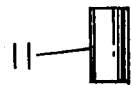
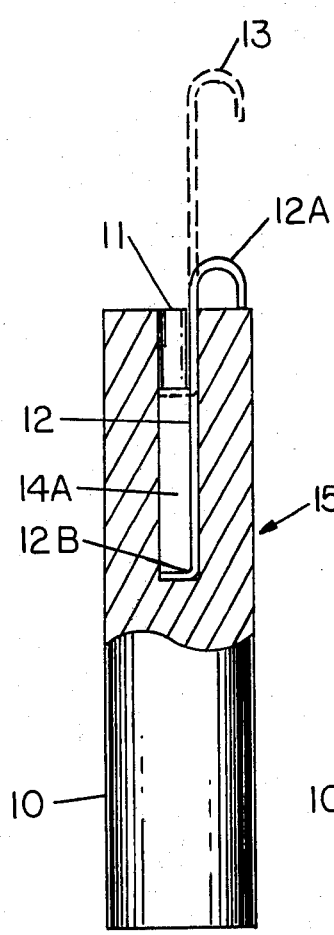
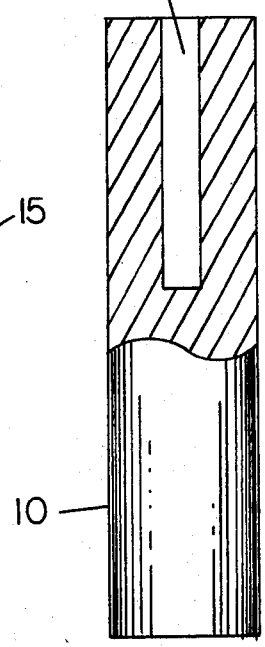
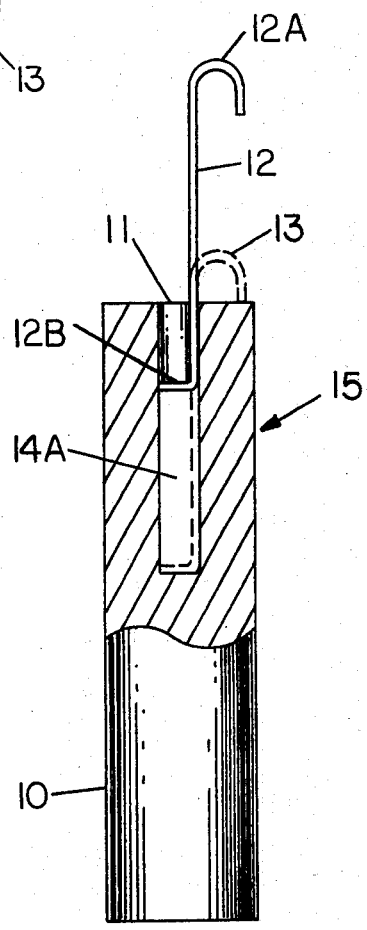

ICE FISHING HOOK RETRIEVER

BACKGROUND OF THE INVENTION

The object of this invention relates to a new and useful method of adapting a solid round wood cylinder forming a handle to a wire shaft hook remover tool and showing how a handle and a wire shaft are associated with each other with a novelty tool resulting.

The selection of wood cylinders for this invention as adaptable to perform the needs, and certain other more specific objects will appear hereinafter.

BRIEF DESCRIPTION OF THE DRAWINGS

FIG. 1 is a side elevational view of my fishhook retriever with a sectional opening to illustrate the details of the construction of this invention, with a fishhook engaging tool in a storage position.

FIG. 2 is a side elevational view with a sectional opening showing interior hole bored therein.

FIG. 3 is a view similar to FIG. 1, with fishhook engaging tool in its operable position.

FIG. 4 is a side elevational view of the cylindrical dowel pin.

FIG. 5 is a side elevational view of the hook engaging tool, showing the bent ends and the wire shaft lying on the same flat plane.

FIG. 6 is a view as in FIG. 5 for illustration symbol of tool.

FIG. 7 is a top end view, showing positions of the dowel pin and wire shaft, and where shaft wedges out from within, between the pin and handle.

FIG. 8 is a bottom end view of the cylinder.

DESCRIPTION OF THE PREFERRED EMBODIMENTS

Referring to the drawings, a fishhook remover of the present invention is indicated by the numeral 15 in FIGS. 1 and 3, and comprises a handle 10, a fishhook engaging tool 12 and a pin 11, shown in FIG. 4.

The fishhook retriever handle 10 is shown in FIG. 2 and is formed as of a solid wood dowel cylinder. The selection of a mass produced dowel cylinder for the handle 10 makes it economical to manufacture, durable in use, and easy to grasp firmly.

A cylindrical cavity 14 is bored into one end of the handle to about one-half the length thereof with the diameter of the cavity being approximately one-fourth the diameter of the cylindrical handle.

The fishhook engaging tool, shown in FIG. 5, comprises an elongated straight wire shaft 12 with a U-shaped hook 12A on one end formed by bending the end portion back upon itself, the other end being bent outwardly in an extended right angular portion 12B equal to the diameter of the cavity 14 in handle 10. Portion 12B extends at a right angle from the shaft 12 and in the opposite direction used to form the hook end 12A. Thus the two bent ends 12A and 12B and the wire shaft 12 will lie in the same flat plane.

The wire used for the tool in FIG. 5 is formed from a stiff tempered steel wire stock.

A related and important detail of the hook retriever 15 is that the extended end 12B extending across diameter of cavity 14 provides that the hook end 12A extends in an outwardly direction from the center of the handle and will prevent the independent rotation of the wire shaft 12.

A solid cylindrical wood dowel pin 11, as shown in FIG. 4, of equal circumference to but shorter than cavity 14, is wedged into the cavity with the top surface of the pin lying flush with the end surface of the handle 10.

It should be noted that with pin 11 equal to the circumference of cavity 14, and with wire shaft 12 disposed therein, using a wood handle 10 and a wood pin 11, will cause the wood to indent, thus wedging pin 11 into the hole 14 with the wire shaft 12 therein.

Wire shaft 12 extends from handle 10 from the edge of pin 11 and hole 14, acting as a wedge to secure pin 11 in the hole 14 with sufficient pressure.

The lengthwise cavity 14A within the handle 10 after pin 11 is wedged into the hole 14 will allow shaft portion 12 to be movable therein; however, with the fixed pressure on the wire shaft 12 from the wood pin 11 and handle 10 an effort is needed to move and position shaft 12.

In FIG. 3, hook 12A is shown extended in a set position to use for engaging a fishhook to help remove the fishhook from a fish, so that the fisherman does not have to handle the fish.

The rigid wire shaft 12 is needed so that the hook end 12A will not bend when removing a fishhook from a fish, and is needed to prevent portion 12B from bending within the handle, and to retain and prevent shaft 12 from rotating.

The fixed direction of hook 12A is shown in the top view in FIG. 7 and shows where shaft 12 extends from the handle 10, wedged therein by pin 11.

Numeral 13 is used in FIG. 1 to indicate in dotted lines the position of the hook 12A when extended, and in FIG. 3 to indicate in dotted lines the position of the hook when retracted.

I claim:

1. An ice fishing hook retriever comprising in combination:
a solid elongated cylindrical handle member formed with a cavity extending inwardly of said handle from one end thereof, a straight wire shaft having a U-shaped hook on one end and a right-angularly bent arm at the other end, the said hook and arm lying in a common plane but extending away from the shaft in opposite directions, the length of said arm plus the thickness of said shaft corresponding to the diameter of said cavity, said shaft being disposed in said cavity for sliding movement therein with said hook being positioned outwardly of said one end of said handle, said shaft corresponding in length to the depth of the cavity, and a dowel pin having a diameter corresponding to the diameter of said cavity, said dowel pin being substantially shorter in length than said cavity and being frictionally fitted into the outer end thereof to close said cavity and secure said shaft and arm therewithin, whereby the pressure of the dowel pin on the shaft permits limited frictional movement of the shaft in said cavity by pulling or pushing said shaft while grasping said handle to extend said hook for use as a hook retriever or to retract and position said hook against said one end of said handle.

* * * * *